(12) United States Patent
Teverovskiy et al.

(10) Patent No.: US 12,371,549 B2
(45) Date of Patent: Jul. 29, 2025

(54) ADDITIVES FOR USE IN LOW SURFACE-ENERGY APPLICATIONS

(71) Applicant: 3M INNOVATIVE PROPERTIES COMPANY, St. Paul, MN (US)

(72) Inventors: Georgiy Teverovskiy, St. Louis Park, MN (US); Maria A. Appeaning, St. Paul, MN (US); Chetan P. Jariwala, Woodbury, MN (US); Robert A. Polik, Minneapolis, MN (US); Colin A. Grambow, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/722,205

(22) PCT Filed: Dec. 21, 2022

(86) PCT No.: PCT/IB2022/062631
§ 371 (c)(1),
(2) Date: Jun. 20, 2024

(87) PCT Pub. No.: WO2023/126783
PCT Pub. Date: Jul. 6, 2023

(65) Prior Publication Data
US 2025/0051549 A1  Feb. 13, 2025

Related U.S. Application Data

(60) Provisional application No. 63/295,171, filed on Dec. 30, 2021.

(51) Int. Cl.
| | | |
|---|---|---|
| *C08K 5/544* | (2006.01) | |
| *C08J 5/18* | (2006.01) | |
| *D01F 1/10* | (2006.01) | |
| *D01F 6/06* | (2006.01) | |
| *D04H 1/4291* | (2012.01) | |
| *D04H 1/56* | (2006.01) | |

(52) U.S. Cl.
CPC .............. *C08K 5/5477* (2021.01); *C08J 5/18* (2013.01); *D01F 1/10* (2013.01); *D01F 6/06* (2013.01); *D04H 1/4291* (2013.01); *D04H 1/565* (2013.01); *C08J 2323/12* (2013.01); *C08K 2201/019* (2013.01); *D10B 2321/021* (2013.01); *D10B 2401/021* (2013.01); *D10B 2501/04* (2013.01)

(58) Field of Classification Search
None
See application file for complete search history.

(56) References Cited

U.S. PATENT DOCUMENTS

| | | |
|---|---|---|
| 4,619,976 A | 10/1986 | Morris et al. |
| 4,843,134 A | 6/1989 | Kotnour et al. |
| 5,110,667 A | 5/1992 | Galick et al. |
| 5,411,576 A | 5/1995 | Jones et al. |
| 5,451,622 A | 9/1995 | Boardman et al. |
| 5,681,963 A | 10/1997 | Liss |
| 5,690,949 A | 11/1997 | Weimer et al. |
| 5,898,046 A | 4/1999 | Raiford et al. |
| 5,977,390 A | 11/1999 | Raiford et al. |
| 6,114,419 A | 9/2000 | Liss et al. |
| 6,288,157 B1 | 9/2001 | Jariwala et al. |
| 7,396,866 B2 | 7/2008 | Jariwala et al. |
| 10,946,399 B2 | 3/2021 | Meuler et al. |
| 2018/0142178 A1 | 5/2018 | Housel et al. |
| 2020/0207948 A1 | 7/2020 | Teverovskiy et al. |

FOREIGN PATENT DOCUMENTS

| | | |
|---|---|---|
| CA | 2162372 A1 | 12/1994 |
| EP | 1000184 B1 | 8/2003 |
| EP | 3357946 A1 | 8/2018 |
| JP | 63101849 A | 5/1988 |
| JP | 4350152 B1 | 10/2009 |
| JP | 4686839 B2 | 5/2011 |
| WO | 2017100045 A1 | 6/2017 |
| WO | 2017189215 A1 | 11/2017 |
| WO | 2017210006 A1 | 12/2017 |
| WO | 2018005285 A1 | 1/2018 |

(Continued)

OTHER PUBLICATIONS

Augusto, "Unraveling the Driving Forces in the Self-Assembly of Monodisperse Naphthalenediimide-Oligodimethylsiloxane Block Molecules", ACS Nano, 2017, vol. 11, No. 04, pp. 3733-3741, XP093028306.

(Continued)

*Primary Examiner* — Robert T Butcher

(57) ABSTRACT

Fluorine-free small molecule additives of structure

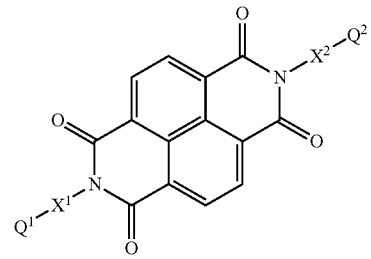

where $X^1$ and $X^2$ are independently hydrocarbyl or heterohydrocarbyl; and $Q^1$ and $Q^2$ are independently —Si—(O—Si(CH$_3$)$_3$)$_3$ or —(O—Si(CH$_3$)$_2$)$_n$—O—Si(CH$_3$)$_3$ and where n is an integer from 0 to 30, inclusive for use in solid-state formulations, e.g., thermoplastic articles, for use in low hysteresis water repellent applications. Methods of preparing such compositions and additives.

17 Claims, No Drawings

(56) References Cited

FOREIGN PATENT DOCUMENTS

| WO | 2018048675 A1 | 3/2018 |
| WO | 2018093623 A1 | 5/2018 |
| WO | 2018169642 A1 | 9/2018 |
| WO | 2018229596 A1 | 12/2018 |
| WO | 2021006319 A1 | 1/2021 |

OTHER PUBLICATIONS

Castanheira, "Synthesis of Novel Periodic Mesoporous Organosilicas Containing 1,4,5,8-Naphthalenediimides Within the Pore Walls and Their Reduction To Generate Wall-Embedded Free Radicals", Langmuir, 2018, vol. 34, No. 28, pp. 8195-8204, XP093027667.

International Search Report for PCT International Application No. PCT/IB2022/062631, mailed on Mar. 16, 2023, 5 pages.

Katritzky, "Design And Synthesis Of Novel Fluorinated Surfactants For Hydrocarbon Subphases", Langmuir, 1988, vol. 04, No. 03, pp. 732-735.

ADDITIVES FOR USE IN LOW SURFACE-ENERGY APPLICATIONS

CROSS REFERENCE TO RELATED APPLICATIONS

This application is a national stage filing under 35 U.S.C. 371 of PCT/IB2022/062631, filed Dec. 21, 2022, which claims the benefit of Provisional Application No. 63/295,171, filed Dec. 30, 2021, the disclosure of which is incorporated by reference in its/their entirety herein.

TECHNICAL FIELD

The present disclosure broadly relates to tris-trimethyl siloxy silane-containing imides and thermoplastic compositions including the same.

BACKGROUND

Partially fluorinated small molecule additives are known and have been used as Polymer Melt Additives ("PMAs") in polyolefin, polyester, and polyamide co-extrusion. These PMAs can impart, for example, static and dynamic water and oil repellency and soil resistance to the resulting nonwovens, fibers, and fabrics into which they are incorporated.

U.S. Pat. No. 5,451,622 (Boardman, et al.) discloses the use of partially fluorinated amides in thermoplastic polymers to impart water and oil repellency to shaped articles, such as fibers and films and to thermoplastic mixtures of fluorochemical and thermoplastic polymer, such as polypropylene, and to the shaped articles thereof, such as fibers and films.

SUMMARY

The present disclosure is directed to fluorine-free small molecule melt additives of structure

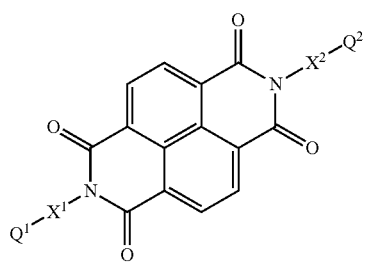

where $X^1$ and $X^2$ are independently hydrocarbyl or heterohydrocarbyl; and $Q^1$ and $Q^2$ are independently —Si—(O—Si(CH$_3$)$_3$)$_3$ or —(O—Si(CH$_3$)$_2$)$_n$—O—Si(CH$_3$)$_3$ and where n is an integer from 0 to 30, inclusive for use in solid-state formulations, e.g., thermoplastic articles, for use in low hysteresis water repellent applications such as, for example, ultra-repellent surfaces. Methods of preparing such compositions and additives are provided.

As used herein, the term "essentially no" amount of a material in a composition may be substituted with "less than 5 weight percent", "less than 4 weight percent", "less than 3 weight percent", "less than 2 weight percent", "less than 1 weight percent", "less than 0.5 weight percent", "less than 0.1 weight percent", or "none".

All scientific and technical terms used herein have meanings commonly used in the art unless otherwise specified.

As used in this specification and the appended claims, past tense verbs, such as, for example, "coated," and are intended to represent structure, and not to limit the process used to obtain the recited structure, unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

Features and advantages of the present disclosure will be further understood upon consideration of the detailed description as well as the appended claims.

DETAILED DESCRIPTION

The incorporation of a partially fluorinated small molecule can allow for in situ functionalization of a bulk material, which may obviate the need for post-processing steps, such as, for example, UV cure and thermal treatment. Such modification may be exemplified in bulk polymer co-extrusions, coatings utilizing a polymeric binder, or combinations thereof. Furthermore, partially fluorinated small molecule additives have found utility as release materials for pressure sensitive adhesives for e-beam-stable release as coatings and are being investigated as low-adhesion backings and premium release liners in solid state/co-extrusion formulations to provide, inter alia, minimal-transfer liners for silicone adhesives enabling premium release features with minimal impact to adhesive performance and the global environment.

However, because fluorinated materials have come under intense regulatory scrutiny, it may be desirable to provide fluorine-free PMAs to enable water repellent products in which fluorochemical use is restricted or disallowed. The PMAs disclosed herein are intended to replace fluorinated materials for use in such applications.

Provided herein composition including a thermoplastic or thermoset polymer and a PMA represented by Formula I

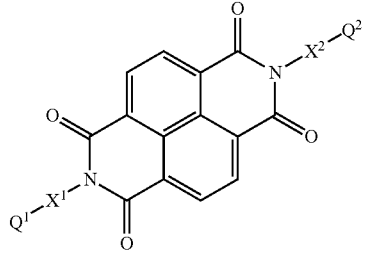

(I)

where $X^1$ and $X^2$ are independently hydrocarbyl or heterohydrocarbyl, and $Q^1$ and $Q^2$ are independently —Si—(O—Si(CH$_3$)$_3$)$_3$ or —(O—Si(CH$_3$)$_2$)$_n$—O—Si(CH$_3$)$_3$ wherein n is an integer from 0 to 30, inclusive. In some embodiments, $X^1$ and $X^2$ are independently —(CH$_2$)$_n$— and n is an integer from 1 to 18, inclusive. In some embodiments, $X^1$ and $X^2$ are —$(CH_2)_n$— and n is 3. In some preferred embodiments, the melt additive compound is represented by the formula

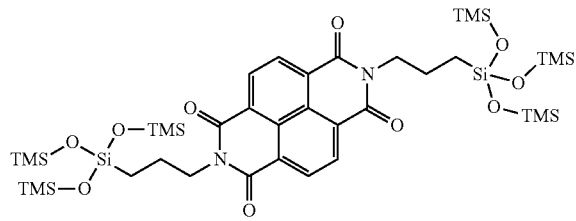 [SMILES: C[Si](C)(C)O[Si](CCCN1C(=O)c2ccc3c4c(ccc(c24)C1=O)C(=O)N(CCC[Si](O[Si](C)(C)C)(O[Si](C)(C)C)O[Si](C)(C)C)C3=O)(O[Si](C)(C)C)O[Si](C)(C)C]

wherein TMS is represented by the formula

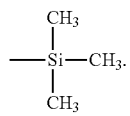

PMAs including tris-trimethyl siloxy silane-containing imides useful in embodiments of the present disclosure may be prepared by methods known to those of ordinary skill in the relevant arts, such as, for example, the methods provided in the Examples section supra.

Polymers useful in embodiments of the present disclosure may include both thermoplastic and thermoset polymers. Preferred thermoplastic polymers include polyesters, such as, for example, polyethylene terephthalate, polybutylene terephthalate, polyphenylene terephthalates, as well as thermoplastic polyurethanes, polyolefins, and renewable and biogradable polyesters, such as those derived from polylactide ("PLA") and polybutylenesuccinate ("PBS"), polymers derived from copolyester resins available under the trade designation SPECTAR from Eastman Chemical Company, Kingsport, Tennessee, USA, and combinations thereof. In some embodiments, the thermoplastic polymer comprises a polyethylene terephthalate film.

A polymer composition of the present disclosure can be melted or shaped, for example by extrusion or molding, to produce shaped articles, such as fibers, films and molded articles whose surfaces exhibit excellent water repellency. The repellent polymer composition is especially useful in the preparation of nonwoven fabrics used in medical gowns and drapes, where repellency to bodily fluids is mandated. In preferred embodiments, the polymer composition comprises essentially no fluorine.

Shaped articles (e.g., fibers, films, and molded or extruded articles) prepared from compositions of the present disclosure can be made, e.g., by blending or otherwise uniformly mixing the PMAs of Formula I and a polymer, such as those described supra, for example by intimately mixing the PMA with pelletized or powdered polymer, and melt extruding the mixture into shaped articles such as pellets, fibers, or films by known methods. The PMA can be mixed per se with the polymer or can be mixed with the polymer in the form of a "masterbatch" (i.e., concentrate) of the PMA in the polymer. Masterbatches typically contain from about 10% to about 25% by weight of the PMA. Also, an organic solution of the PMA may be mixed with the powdered or pelletized polymer, the mixture dried to remove solvent, then melted and extruded into the desired shaped article. Alternatively, molten PMA (as a compound(s) or masterbatch) can be injected into a molten polymer stream to form a blend just prior to extrusion into the desired shaped article. When using thermoset resins, such as epoxy resins, urethanes and acrylates, the PMA may be mixed with the resin and cured by application of heat. Preferably such thermoset resins may be processed by reactive extrusion techniques such as are taught in U.S. Pat. No. 4,619,976 (Kotnour) and U.S. Pat. No. 4,843,134 (Kotnour).

Thermoplastic compositions containing the compounds of Formula I (i.e., PMA) may be used to provide water repellency to materials such as, for example, non-woven fabrics. Such non-woven fabrics may be particularly useful in personal protective equipment and devices, such as, for example, clothing, masks, guards, and shields. The disclosed PMAs are melt processible, i.e., suffer substantially no degradation under the melt processing conditions used to form the materials. The amount of PMA in the composition is that amount sufficient to produce a shaped article having a surface with the desired properties. Thermoplastic compositions containing the PMAs of Formula I may commonly include 0.1 wt. % to 10 wt. %, optionally, 0.5 wt. % to 7 wt %, optionally 1 wt. % to 3 wt. % of the PMA relative to the total weight of the thermoplastic polymer to which they are added.

The present disclosure focuses on the development of a fluorine-free tris-trimethyl siloxy silane-containing imide additive for thermoplastic polymers that is stable at typical processing temperatures, imparts advantageous surface energy characteristics, and has minimal global environmental impact.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, materials used in the examples were obtained from commercial suppliers (e.g., Aldrich Chemical Co., Milwaukee, Wisconsin) and/or made by known methods. Materials prepared in the examples were analyzed by NMR spectroscopy and were consistent with the given structures.

Materials Used in the Examples

| Abbreviation | Description and Source |
|---|---|
| ATTS | (3-aminopropyl)tris(trimethylsiloxy)silane, obtained as product code SIA0620.0 from Gelest Inc., Morrisville, Pennsylvania |
| NTCD | 1,4,5,8-naphthalenetetracarboxylic dianhydride, obtained as product code N818 from Millipore Sigma, Burlington, Massachusetts |
| EXFOLA | An additive for polyolefin, such as polyethylene (PE) and polypropylene (PP), that combines the characteristics of polyolefin and silicone, obtained under the trade designation "EXFOLA-PP 2000" from Mitsui Chemicals America Inc., San Jose, California |
| Xylenes | Xylenes, can be obtained from Millipore Sigma, Burlington, Massachusetts |
| PP | An extremely high melt flow rate polypropylene resin with very narrow molecular weight distribution, obtained under the trade designation "METOCENE MF650X" from LyondellBassell, Houston, Texas |

Test Methods

Water Repellency Test

From the 2020 American Association of Textile Chemists and Colorists (AATCC) Manual AATCC TM193-2007:

This test measures the resistance of treated fabric to water-based challenges. A drop of one standard Surface tension fluid (of a series of 8, with decreasing Surface tensions, based on water and water/isopropyl alcohol mixtures where 100 percent water is a 0 rating, and a mixture of 40 percent water, 60 percent IPA is an 8 rating) is placed on a treated fabric to form a bead. If after thirty seconds there is no wetting, the next highest standard number fluid (next lowest Surface tension) is tested. When the lowest number fluid soaks into the fabric, the next lower number is the rating. For example, the fabric will receive a three rating, if the number four fluid wets the fabric. A more detailed description of the test is written in AATCC TM-193-2004.

Spray Rating (SR) Test

From the 2020 AATCC Manual AATCC TM22-2017:

The spray rating of a treated Substrate is a value indicative of the dynamic repellency of the treated substrate to water that impinges on the treated Substrate. The repellency was measured by Test Method 22-1996, published in the 2001 Technical Manual of the AATCC, and was expressed in terms of a spray rating (SR) of the tested substrate. The spray rating was obtained by spraying 250 ml water on the substrate from a height of 15 cm. The wetting pattern was visually rated using a 0 to 100 Scale, where 0 means complete wetting and 100 means no wetting at all.

PREPARATORY EXAMPLES

Preparation of Additive 1 (AD1)

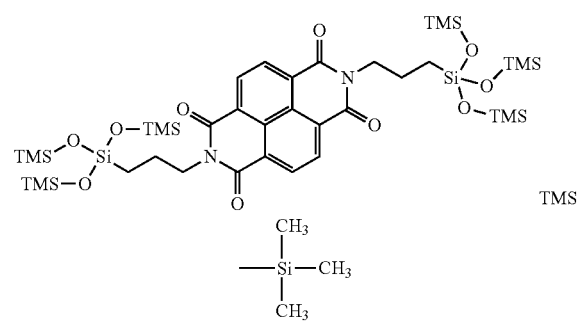

1,4,5,8-naphthalenetetracarboxylic dianhydride (25 g, 93.2 mmol) and xylenes (115 mL) were added to a 1 L round bottom flask equipped with a magnetic stir bar, Dean-Stark apparatus, and reflux condenser. While stirring, (3-aminopropyl)tris(trimethylsiloxy)silane (65.96 g, 186.4 mmol was added dropwise over a 30 minute period via syringe. Upon completion of the addition, the reaction flask was wrapped in glass wool and the mixture was slowly heated to 130° C. at which point water began to collect in the Dean-Stark apparatus. The temperature was increased to 180° C. over a two-hour period of time and the mixture was allowed to stir over night at 180° C. The Dean-Star apparatus and reflux condenser were then replaced with a distillation head equipped with thermometer, vacuum adapter, and receiving flask. Solvent was removed via distillation under reduced pressure to afford AD1 as a dark colored solid.

Preparation of Modified Polypropylene (PP) Melt-Blown Fabric:

PP was extruded or co-extruded with additive (2.5 to 15 wt % as shown in Table 1) on a blown melt fiber line. The extruder used was a Brabender CTSE-V counter-rotating conical twin screw extruder (Brabender GmbH & Co KG, Duisberg, Germany) with a maximum extrusion temperature of approximately 275° C., and with the distance to the collector of approximately 2.75 inches (7.0 cm). The additive (when present) and thermoplastic polymer were each weighed and were then added simultaneously to the extruder at varying rates to maintain 9.85 lbs hr (4.47 kg/hr) of polymer and 0.15 lbs/hr (0.068 kg/hr) of additive to maintain a total throughput rate of 10 lbs/hr (4.5 kg/hr). The process conditions for each mixture were the same, including the melt blowing die construction used to blow the microfiber web, the basis weight of the web (100±5 g/m$^2$) and the diameter of the microfibers (10 to 20 micrometers). The extrusion temperature was approximately 240° C., the primary air temperature was 350° C., the pressure was 5 psi (34 kPa), with a 0.030 inch (0.76 cm) air gap width and the polymer throughput rate was about 10 lbs/hr (4.5 kg/hr).

The resulting nonwovens were evaluated according to the above-referenced test methods. Results are reported in Table 1 below.

TABLE 1

Water Repellency and Spray Rating Measurements

| Nonwoven | Additive | Wt. % Additive | Water Repellency | Spray Rating |
|---|---|---|---|---|
| CE-A | — | — | 4 | 95 |
| CE-B | EXFOLA | 5 | 4 | 90 |
| CE-C | EXFOLA | 10 | 4-5 | 100 |
| CE-D | EXFOLA | 15 | 4-5 | 100 |
| EX-1 | AD1 | 2.5 | 6 | 100* |

*This sample was considerably more water repellent than others that scored 100 and it required no taps to dislodge water from the nonwoven.

AD1 increases the ability of the PP nonwoven to resist penetration of a water/alcohol mixture up to 40% isopropanol. Furthermore, spray rating is substantially increased over commercially available additives and is accomplished with significantly lower levels of additive.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A melt additive compound represented by the general formula

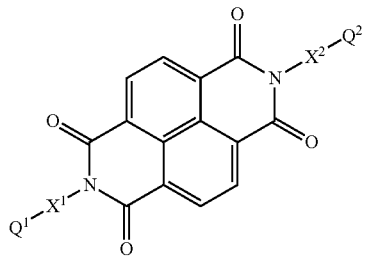

wherein:
X¹ and X² are independently —(CH$_2$)$_n$— and wherein n is an integer from 1 to 18, inclusive; and
Q¹ and Q² are independently —Si—(O—Si(CH$_3$)$_3$)$_3$ or —(O—Si(CH$_3$)$_2$)$_n$—O—Si(CH$_3$)$_3$ wherein n is an integer from 0 to 30, inclusive.

2. The melt additive compound of claim 1, wherein X¹ and X² are —(CH$_2$)$_n$— and n is 3.

3. The melt additive compound of claim 1 represented by the formula

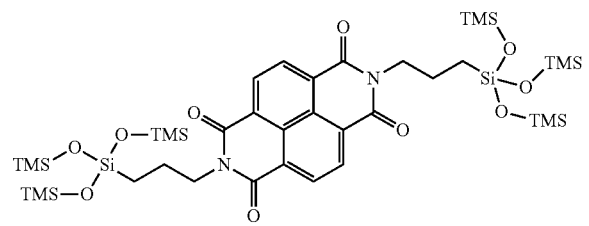 [SMILES: C[Si](C)(C)O[Si](CCCN1C(=O)c2ccc3c4c(ccc(c24)C1=O)C(=O)N(CCC[Si](O[Si](C)(C)C)(O[Si](C)(C)C)O[Si](C)(C)C)C3=O)(O[Si](C)(C)C)O[Si](C)(C)C]

wherein TMS is represented by the formula

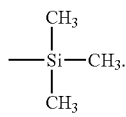

4. A composition comprising:
a thermoplastic polymer; and
an additive represented by the structure

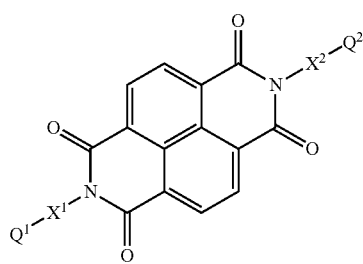

wherein:
X¹ and X² are independently hydrocarbyl or heterohydrocarbyl; and
Q1 and Q2 are independently —Si—(O—Si(CH$_3$)$_3$)$_3$ or —(O—Si(CH$_3$)$_2$)$_n$—O—Si(CH$_3$)$_3$ wherein n is an integer from 0 to 30, inclusive.

5. The composition of claim 4, wherein the thermoplastic polymer is selected from the group consisting of a polyolefin resin, a polyester resin, and combinations thereof.

6. The composition of claim 5, wherein the thermoplastic polymer comprises a polypropylene resin.

7. The composition of claim 4, wherein the composition comprises 0.1 wt. % to 10 wt. % of the additive relative to the weight of the thermoplastic polymer.

8. The composition of claim 4, wherein the composition comprises essentially no fluorine.

9. A fiber comprising the composition of claim 4.

10. An extruded article comprising the composition of claim 4.

11. The extruded article of claim 10, wherein the extruded article is a film.

12. A non-woven fabric comprising the composition of claim 4.

13. A personal protective device comprising the non-woven fabric of claim 12.

14. A method of preparing a composition, the method comprising:
combining a thermoplastic polymer with an additive to provide the composition, the additive represented by the structure

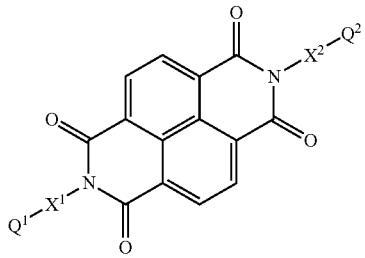

wherein:
X¹ and X² are independently hydrocarbyl or heterohydrocarbyl; and
Q1 and Q2 are independently —Si—(O—Si(CH$_3$)$_3$)$_3$ or —(O—Si(CH$_3$)$_2$)$_n$—O—Si(CH$_3$)$_3$ wherein n is an integer from 0 to 30, inclusive.

15. The method of claim 14, wherein X¹ and X² are independently —(CH$_2$)$_n$- and wherein n is an integer from 1 to 18, inclusive.

16. The method of claim 14, wherein X¹ and X² are —(CH$_2$)$_n$— and n is 3.

17. The method of claim 14, wherein the additive is represented by the formula

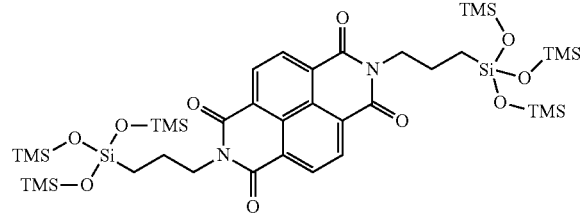 [SMILES: C[Si](C)(C)O[Si](CCCN1C(=O)c2ccc3c4c(ccc(c24)C1=O)C(=O)N(CCC[Si](O[Si](C)(C)C)(O[Si](C)(C)C)O[Si](C)(C)C)C3=O)(O[Si](C)(C)C)O[Si](C)(C)C]

wherein TMS is represented by the formula

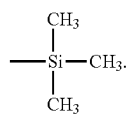

* * * * *